United States Patent [19]

Takeuchi

[11] Patent Number: 5,205,607
[45] Date of Patent: Apr. 27, 1993

[54] AUTOMOBILE WITH REMOVEABLE ROOF
[75] Inventor: Yoshinori Takeuchi, Tokyo, Japan
[73] Assignee: International Prototype Laboratory, Inc., Tokyo, Japan
[21] Appl. No.: 803,411
[22] Filed: Dec. 6, 1991
[30] Foreign Application Priority Data Sep. 30, 1991 [JP] Japan .................. 3-087437[U]

[51] Int. Cl.⁵ .................................................. B60J 7/00
[52] U.S. Cl. ............................ 296/210; 296/218; 296/107
[58] Field of Search ............. 296/218, 216, 107, 117, 296/201

[56] References Cited

U.S. PATENT DOCUMENTS

| | | | |
|---|---|---|---|
| 4,634,231 | 1/1987 | Poncelet et al. | 296/218 X |
| 4,679,847 | 7/1987 | Dirck | 296/218 |
| 4,819,982 | 4/1989 | Eyb | 296/107 |
| 4,950,022 | 8/1990 | Pattee | 296/107 |

FOREIGN PATENT DOCUMENTS 828962 11/1938 France ........................... 296/218

Primary Examiner—Robert R. Song
Attorney, Agent, or Firm—Sughrue, Mion, Zinn, Macpeak & Seas

[57] ABSTRACT

An automobile has a body 1 and a hood 2. In the body 1, seats 1B and 1C are arranged, and four sides (left, right, rear and upper) around the seats 1B and 1C are open. The hood 2 is separate from the body 1 and is integrally formed. The hood 2 is formed by a transparent member, and is mounted (or dismounted) freely on the body 1. The hood 2, when mounted, encloses the four sides of the seats. Preferably, the hood 2 is formed from polycarbonate resin.

5 Claims, 4 Drawing Sheets

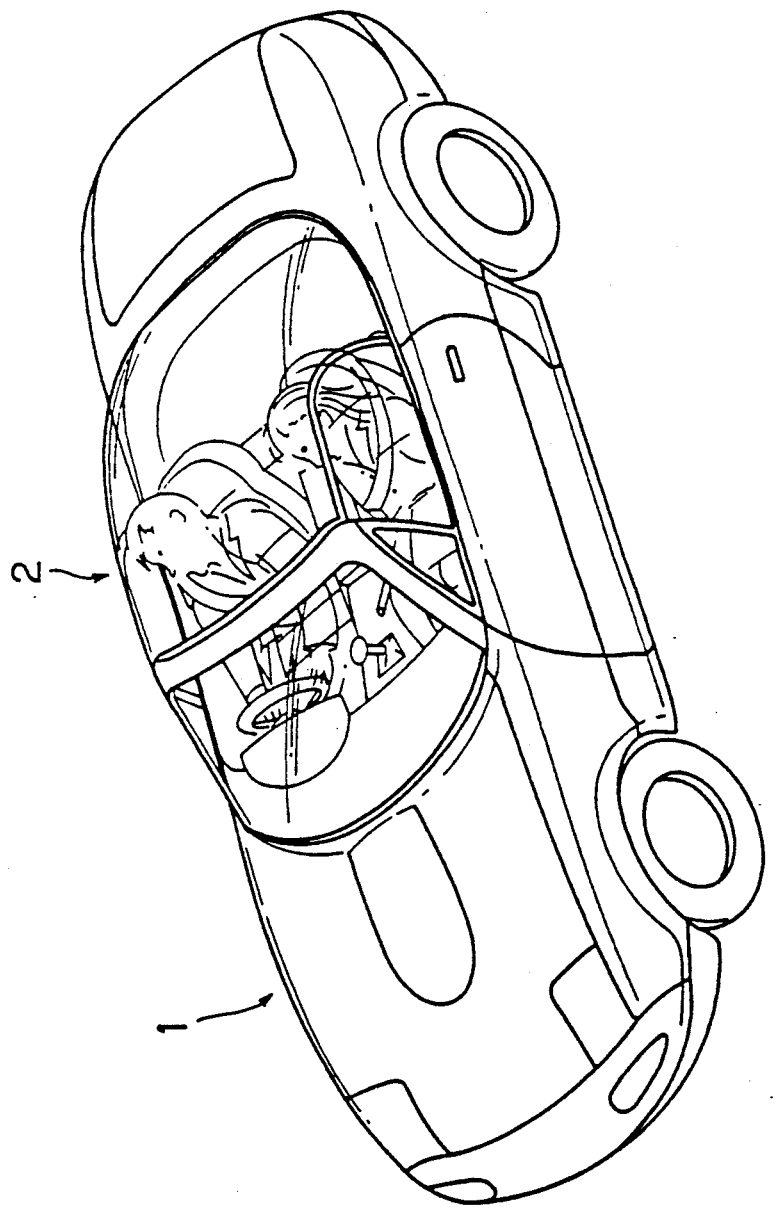

AUTOMOBILE WITH REMOVEABLE ROOF

BACKGROUND OF THE INVENTION

The present invention relates to an automobile with a roof (hereinafter referred to as a "hood"). More particularly, it relates to an automobile with a hard-top-type hood.

Generally, an automobile is called an "open car" (i.e., a convertible), if a non-fixed roof can be opened when desired. As is well known, this type of hood is divided into a hard-top-type and a soft-top-type. The hard top can be selectively positioned on a body of the automobile. That is, it is freely exchangeable. However, the soft top cannot be freely selected, because it is integrated with the body.

Further, a maker of the hard top may be different from that of the automobile body. Hence, when are opened by removing the hard top from the body, and so the automobile can be used with the top removed (e.g., a convertible).

On the other hand, the soft top is mounted on the body by bellows. Hence, when desired, the top is lowered by pivoting the top in the rear direction of the body, and thus the automobile can be used with the top down.

As mentioned above, the present invention relates to an automobile with a hard-top-type hood.

A conventional automobile hood has the following problems.

(1) The manufacturing processes are complex.

The hard-top-type hood is conventionally manufactured by pasting two glass fibers together. That is, at first, the right side of a first glass fiber is finished. Next, the back side of a second glass fiber is finished. Then, the two finished glass fibers are pasted together. Finally, a rear window is formed at the rear of the finished glass fibers. Thus, the above-described conventional hard-top-type hood is completed.

However, as mentioned above, the conventional hood must be manufactured by finishing two glass fibers respectively, thereafter pasting them together, and moreover forming the rear window. Accordingly, the manufacturing processes of the conventional hood are complex.

(2) The conventional hood is heavy.

As mentioned above, since the conventional hood is formed by pasting two glass fibers, that is, two members together, the hood is heavy and bulky. Thus, mounting and removing the conventional hood on the body are troublesome.

(3) The visual field is poor.

The conventional hood is opaque. Hence, when it is mounted on the automobile body, the visual field of the occupants in the automobile is poor.

(4) A vehicle occupant feels cramped and uncomfortable (i.e., claustrophobic) with the conventional hood.

As mentioned above, the conventional hood is opaque. Hence, when the hood is mounted on the body, the entire interior of the automobile is dark. Accordingly, a vehicle occupant feels cramped and surrounded from four sides (e.g., left, right, rear, and from above).

(5) An automobile having the conventional hood is dangerous.

The conventional hood is opaque, and, accordingly, when an automobile therewith is to be used with the top down, the automobile must be driven after the hood is dismounted therefrom. However, in this case, the vehicle occupants are exposed on all four sides. Hence, the occupants are defenseless to objects being thrown at the automobile etc., whereby the occupants are injured. Accordingly, the automobile having the conventional hood is very dangerous.

Further, dust enters easily into the automobile with the conventional hood, and the vehicle gets dirty quite easily.

SUMMARY OF THE INVENTION

An object of the present invention is to provide an automobile with a hood, wherein the manufacturing processes of the hood are simplified, the hood is lightweight, and, when the hood is mounted on the body, the visual field of the automobile's occupants is good, and the occupants feel open and safe.

The above-mentioned object can be achieved by an automobile with a hood, a body 1 in which seats 1B and 1C are arranged, the four sides (e.g., left, right, rear and upper) around the seats 1B and 1C being open, and a hood 2 which is separate from the body 1 and which is integrally formed, the hood 2 being transparent, and being mounted (or removed) freely on the body 1, with the four sides being enclosed by the hood when the hood is mounted on the body.

BRIEF DESCRIPTION OF THE DRAWINGS

Further features and advantages of the present invention will be apparent from the description below with reference to the accompanying drawings, wherein:

FIG. 4 is an explanatory drawing of the operation of the present invention.

DESCRIPTION OF THE PREFERRED EMBODIMENTS

Figure 1:
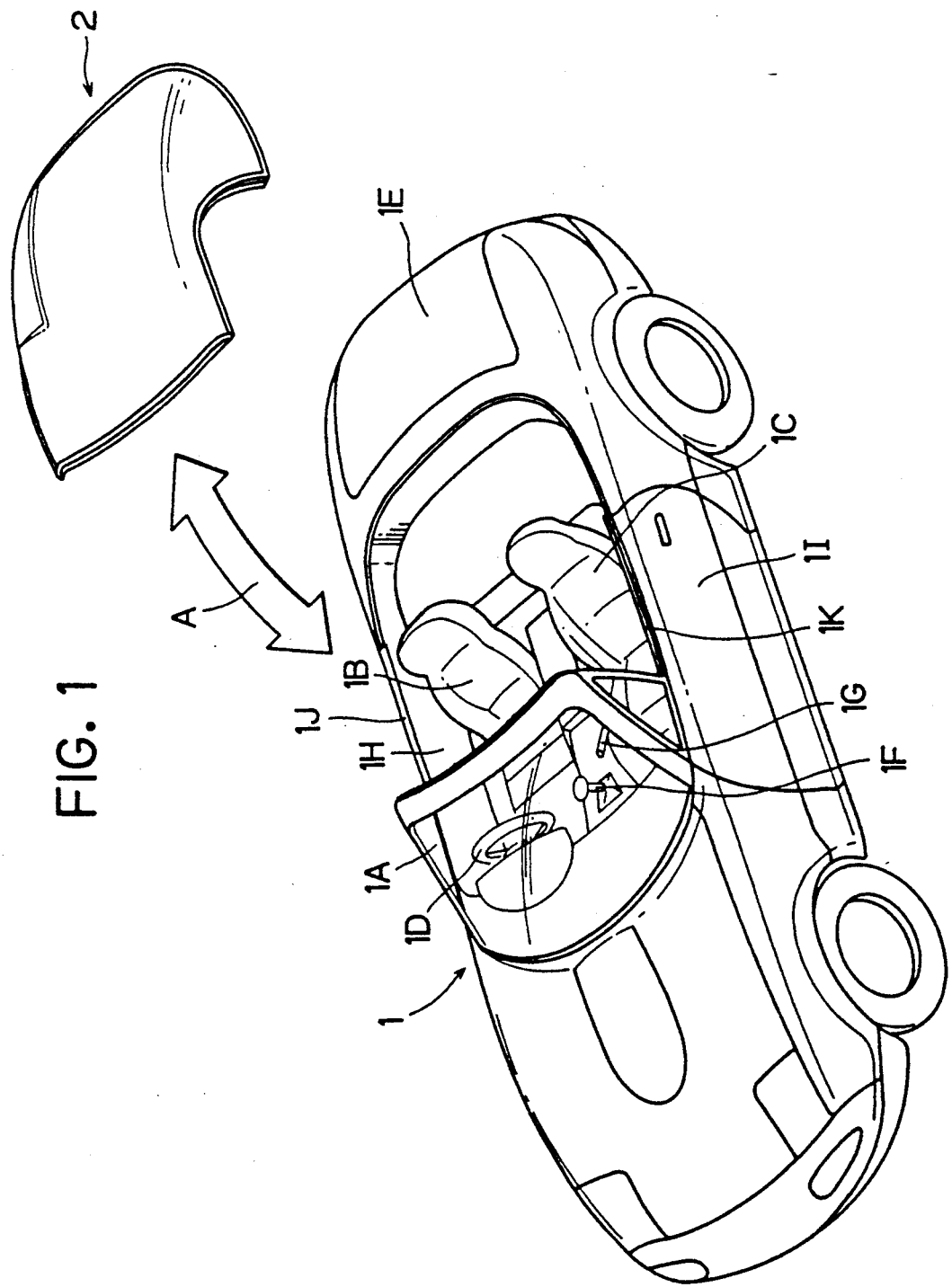
FIG. 1 illustrates an embodiment of the present invention.

FIG. 1 illustrates an embodiment of the present invention and shows a body 1 of an automobile with a hood 2.

The body 1 has a sports car-type configuration, for example, having two seats 1B and 1C, with the four sides (e.g., left, right, rear and upper) of the seats being open.

In the vicinity of the seats 1B and 1C, as is well known, a handle 1D is placed in front of the seat 1B, and a transmission lever (e.g., a clutch stick shift) 1F and a hand brake 1G are arranged between both seats 1B and 1C.

Moreover, doors 1H and 1I, a front window 1A, and a trunk 1E, are provided on the left and right, in front, and the rear of the body, respectively. On the other hand, the hood 2 is separate from the body 1, and is mountable (or removable) on the body 1, as shown with an arrow A.

The hood 2 has a configuration corresponding to the four sides (left, right, upper, and rear) of the seats 1B and 1C. Hence, when the hood 2 is mounted on the body 1 (see FIG. 4), it encloses the abovementioned four sides.

The hood is entirely transparent and is integrally formed as one member. The hood may be formed, for example, of polycarbonate resin. Polycarbonate resin, as is well known, is a type of thermoplastic resin, and is transparent. The hood 2 is preferably integrally molded from polycarbonate resin.

The above-mentioned polycarbonate resin is also temperature-resistant, shock-resistant and fire-resistant. Hence, polycarbonate resin is one of the most suitable materials from which the hood 2 of the present invention may be made.

Figure 2A:
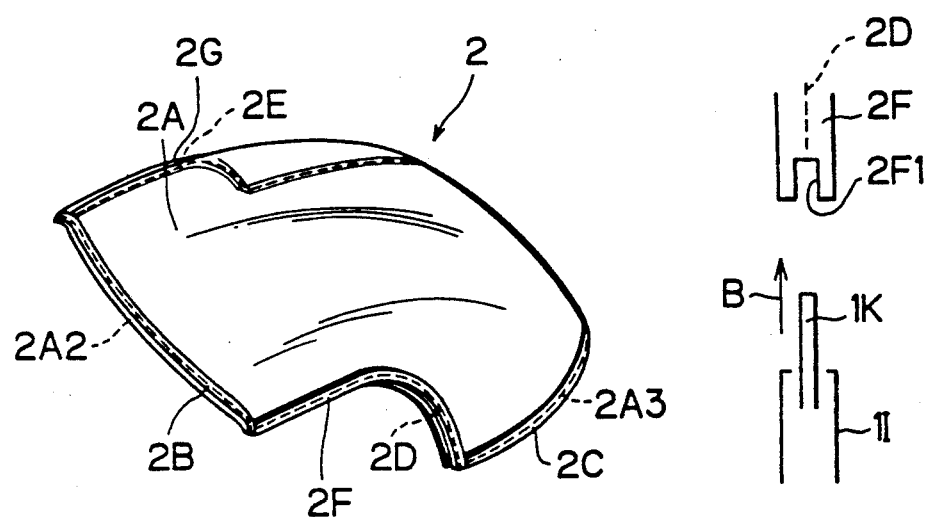
FIG. 2A is a perspective view of the hood according to the present invention.

The hood 2 will be explained in detail hereinafter, based on FIGS. 2A to 2B, and 3A to 3C. As is apparent from the drawings, a body portion 2A is transparent, and on the front and rear portions 2A2 and 2A3 of body portion 2A, rubber packings 2B and 2C are provided, respectively, as shown in FIG. 2A. As a result, when the hood 2 is mounted on the body 1 (as shown in FIG. 4), the interior of the car is airtight.

The shape of the hood 2 should correspond to the opening portion of the body 1. Thus, the hood 2 is designed to snugly fit to the body when it is mounted on the body as shown in FIG. 4. Hence, cutting portions 2D and 2E are formed on the left and right sides of the hood 2, as shown in FIG. 2A. The left and right side windows 1K and 1J (see FIG. 1) are fitted in the cutting portions 2D, 2E, respectively, when the windows are rolled up.

As shown in FIG. 2A, a packing 2F is provided on the cutting portion 2D, and has a groove 2F1 formed thereon. Accordingly, when the left side window 1K is rolled up from the left door 1I in the direction of an arrow B of FIG. 2A, the window 1K is inserted into the groove 2F1 to make the vehicle's interior airtight.

Regarding the right cutting portion 2E, the relationship between the packing 2G and the right side window 1J is the same as that regarding the above-described left cutting portion 2F.

Figure 2B:
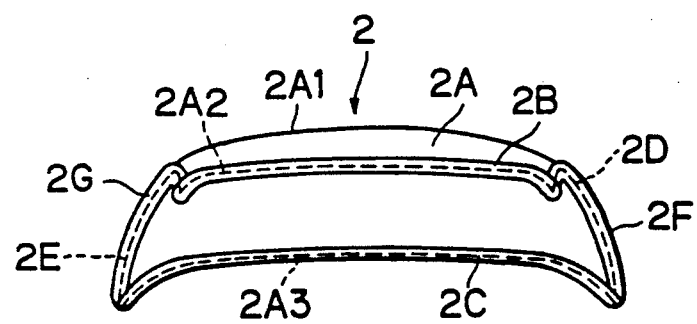
FIG. 2B is a front view of the hood according to the present invention.

FIG. 2B is a front view of the hood 2 used for the present invention. The body portion 2A has a top portion 2A1 having a smooth, circular shape, and a circularly-shaped front portion 2A which has a smaller curvature than the top portion 2A1. The front portion 2A2 is provided with the packing 2B.

On the other hand, most of the rear portion 2A3 has a linear shape, as compared with the above-described top and front portions 2A1 and 2A2. Only both ends of the rear portion 2A3 are bent.

The packing 2C is provided on the rear portion 2A3, and the packings 2F and 2G are provided on the cutting portions 2D and 2E as illustrated in FIG. 2B.

Figure 3A:
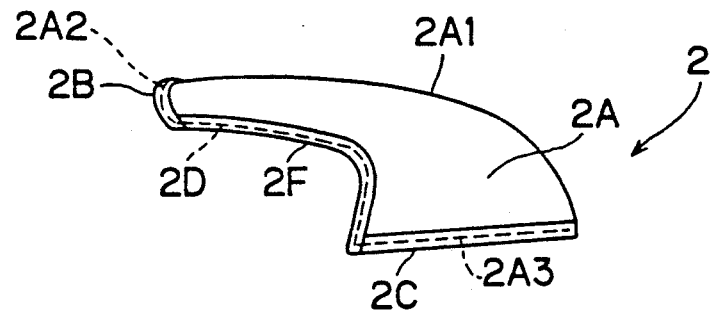
FIG. 3A is a left side view of the hood according to the present invention.

FIG. 3A is a left side view of the hood according to the present invention. The body portion 2A has, as a whole, the same configuration as a fixed (i.e., nondetachable) roof of the typical automobile, and the top portion 2A1 also corresponds to the abovementioned fixed roof.

As mentioned above, the packing 2F, provided on the left cutting portion 2D, is formed corresponding to the left side window 1K which is extendable from the left door 1I of the body 1 and which is exposed.

Figure 3B:
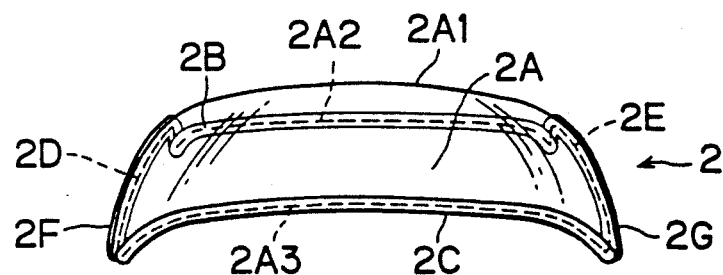
FIG. 3B is a back view of the hood according to the present invention.

FIG. 3B is a rear view of the hood 2 of the present invention, and is substantially similar to FIG. 2B showing the front view of the hood. Hence, the top portion 2A1 of the body portion 2A has a smooth circular shape, and the front portion 2A2 has a curvature smaller than that of the top portion of 2A1. Most of the rear portion 2A3 is linearly shaped, as compared with the above-mentioned top and front portions 2A1 and 2A2. Only both ends of the rear portion 2A3 are bent.

Since the body portion 2A is transparent, the packing 2B of the front portion 2A2 and the packings 2F and 2G of the cutting portions 2D and 2E, respectively, may be observed through the transparent body portion 2A, as shown in FIG. 3B.

Figure 3C:
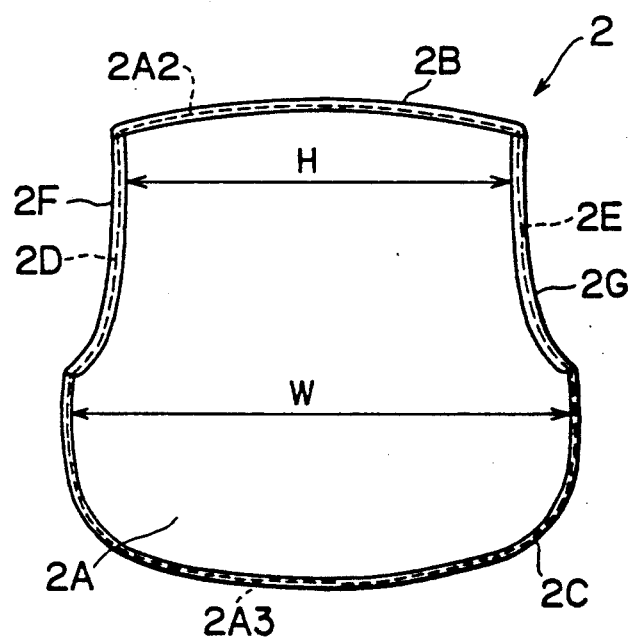
FIG. 3C is a top view of the hood according to the present invention.

FIG. 3C is a top view of the hood 2. The width of the area where the packing 2C is provided is W, and the width of the area where the packings 2F and 2G are provided is H. The body portion 2A is scooped out slightly towards the front portion 2A2 from the area of the packing 2C, and continues to the area of the packings 2F and 2G in a gradually narrowing state.

Accordingly, the width W of the packing 2C is larger than the width H between the packings 2F and 2G. Since the right side of the hood is symmetrical to the left side thereof, as shown in FIG. 3A, explanation of the right side will be omitted.

The operation of the present invention will be explained hereinafter. As mentioned, the integrally-formed hood 2 is separate from the body 1. The hood is made from polycarbonate resin. This polycarbonate resin is a type of thermoplastic resin, and is transparent.

Since the hood 2 is formed integrally as one member, it is unnecessary to provide the vehicle with a separate rear window. Accordingly, compared with the conventional hood, the manufacturing process of the hood 2 is simple. Moreover, since the hood 2 has a unitary construction, it is very lightweight, whereby the operation of mounting (or dismounting) the hood on the body 1 is easily performed.

On the other hand, the hood 2 is transparent, and the hood encloses four sides of the seats 1B and 1C. Hence, due to the transparency of the hood, when the hood 2 is mounted on the body 1, the visual field of the vehicle's occupants is extremely wide, and since the inside of the automobile is illuminated, the occupants feel a sense of openness and spaciousness. Moreover, since the hood is transparent, with the four sides of the seats 1B and 1C being enclosed by the hood 2 mounted on the body 1, an occupant has a field of view similar to that for a car with the top down.

Hence, the automobile occupants are perfectly safe from objects being thrown at the automobile etc.

Still further, since the hood prevents dust from entering the automobile, the interior of the vehicle can be kept clean.

As mentioned above, according to the present invention, an automobile has a body 1, in which seats 1B and 1C are arranged, the four sides (left, right rear and upper) around the seats 1B and 1C being open, and a hood 2 which is separate from the body 1 and which is integrally formed. The hood 2 is transparent, and is freely mountable on the body 1, the four sides being enclosed by the hood when the hood is mounted on the automobile.

Thus, according to the present invention, as shown in FIG. 1, the hood 2 is separate from the body 1, and is integrally formed. The hood is transparent, and is freely mountable or dismountable on the body 1, the four sides of the seats 1B and 1C being enclosed by the hood mounted on the automobile. Hence, since the hood 2 is integrally formed from polycarbonate resin, etc. and as one member, the manufacturing process thereof is simple, and the hood is lightweight.

Further, since the hood 2 is transparent, when it is mounted on the body 1, an occupant's visual field is good and the occupant feels openness and spaciousness. Further, since the automobile may be driven similarly to a convertible having its top down while the hood 2 is mounted on the body 1 of the automobile, the occupants are relatively safe from objects being thrown at the automobile, etc.

Accordingly, the present invention provides an automobile with a hood, wherein the manufacturing process of the hood is simple, the hood is lightweight, and, when the hood is mounted on the body, the visual field of the automobile's occupants is good, and the occupants feel openness and secure.

I claim:

1. An automobile, comprising:
   a body 1 in which seats 1B and 1C are arranged, said seats having four sides which are open and unobstructed;
   a rigid hood 2, provided separately from said body 1 and being integrally formed, said hood 2 comprising in its entirety a transparent material and being freely mountable on said body 1, such that said hood 2 encloses said four sides of said seats; and
   means for supporting said hood, said hood supporting means solely comprising a windshield and said body such that a field of vision of an occupant in said automobile is substantially completely unobstructed by said hood supporting means.

2. An automobile according to claim 1, wherein said hood 2 comprises polycarbonate resin.

3. An automobile according to claim 2, further comprising rubber packings provided on said hood.

4. An automobile according to claim 3, wherein said hood includes first and second cutting portions, said automobile further comprising first and second windows for being inserted, respectively, into said first and second cutting portions.

5. An automobile according to claim 4, further comprising a packing provided on said first cutting portion, said packing including a groove formed thereon.

* * * * *